May 17, 1960 R. O. BOWMAN 2,936,919
BOAT TRAILER
Filed Feb. 3, 1958 2 Sheets-Sheet 1
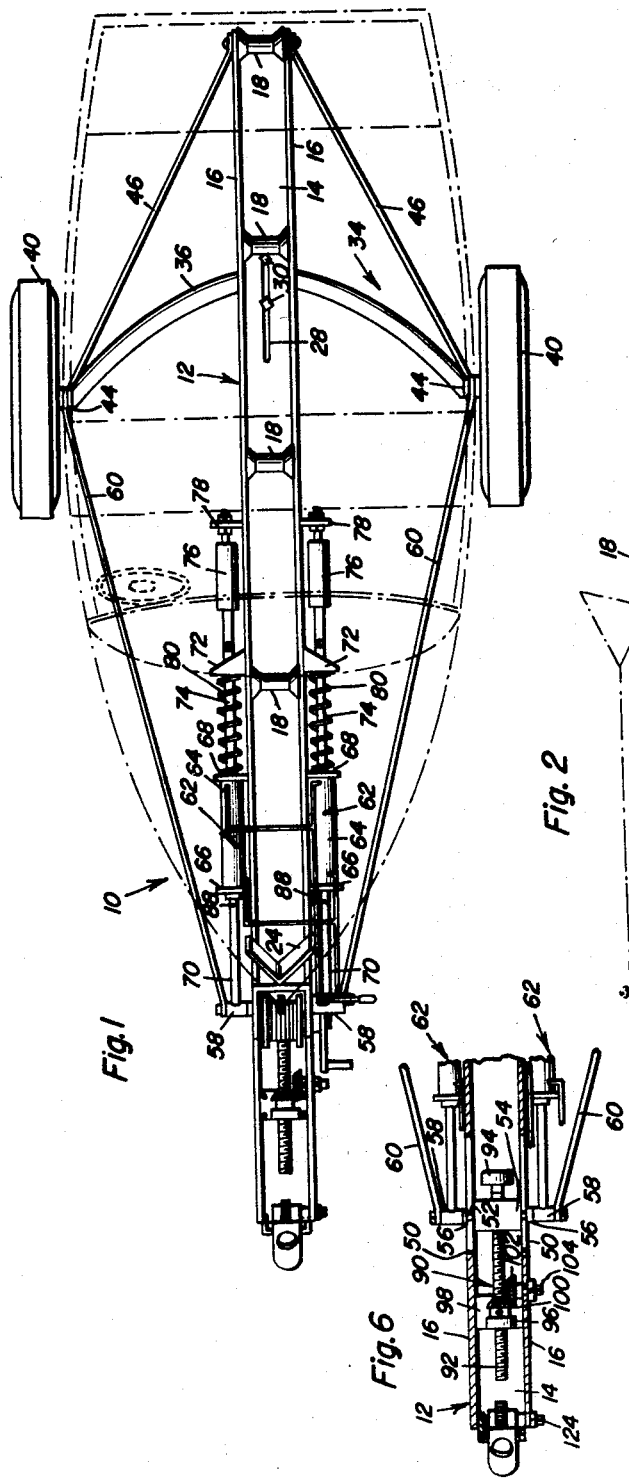
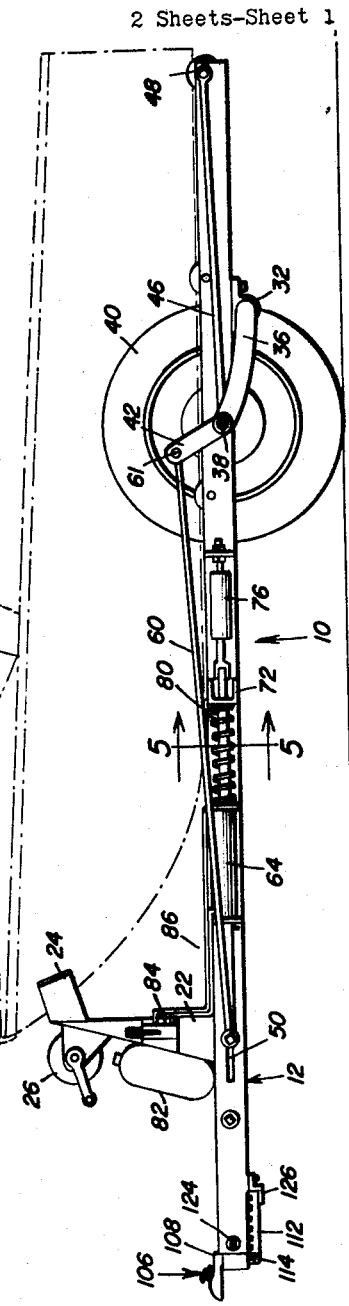
Roy O. Bowman
INVENTOR.
BY
Attorneys

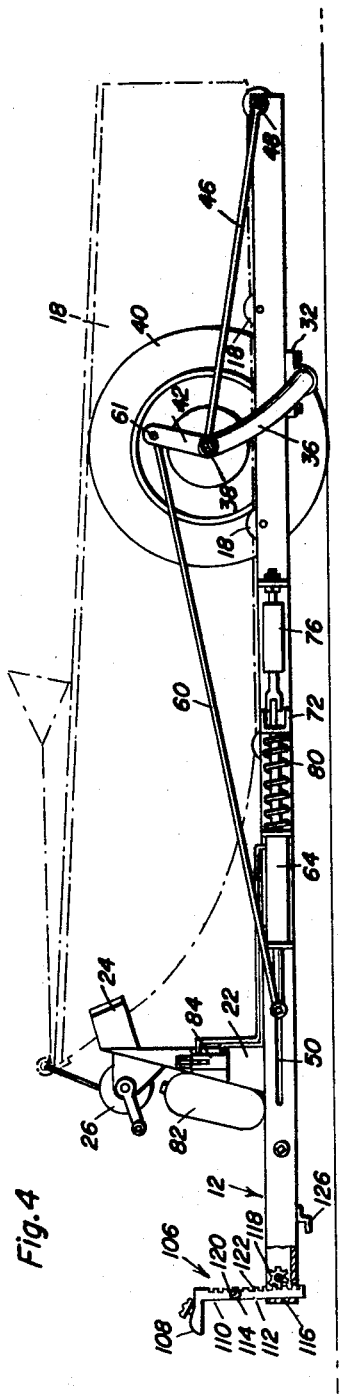
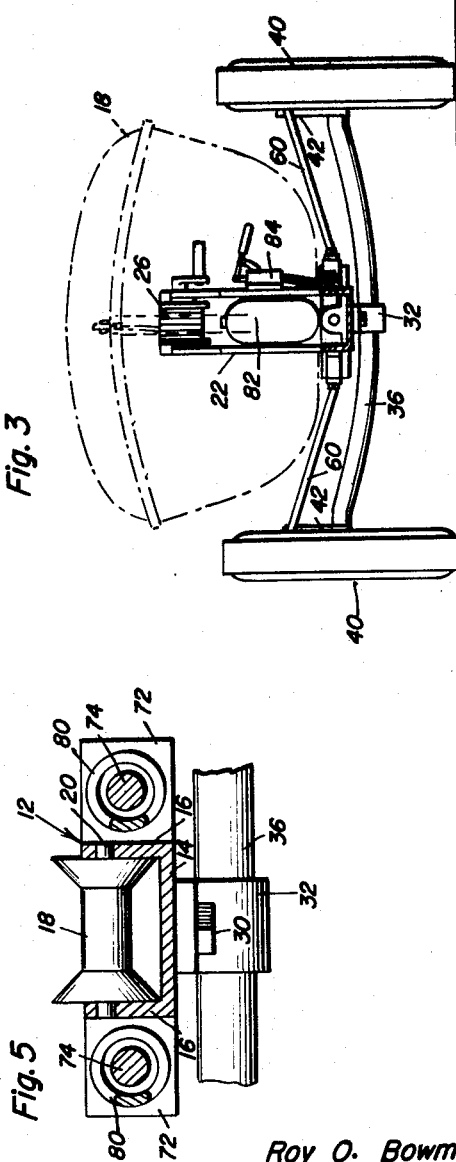
Roy O. Bowman
INVENTOR.

United States Patent Office 2,936,919
Patented May 17, 1960

2,936,919

BOAT TRAILER

Roy O. Bowman, Everett, Wash.

Application February 3, 1958, Serial No. 712,801

6 Claims. (Cl. 214—505)

This invention relates in general to new and useful improvements in trailer construction, and more specifically to an improved boat trailer.

In the launching of small boats from trailers, one of the main problems is to obtain water of sufficient depth to float the boat off of the trailer. This requirement can be greatly reduced by lowering the trailer. In the past many attempts have been made to provide axles of the crank type which will permit the trailer to be lower relative to the ground by swinging the axles. However, the resultant structure generally has not proved successful inasmuch as the operating means for swinging the crank axles have proved difficult to operate. Also, the type of operating means required for the crank axle normally requires a rigid connection with the trailer frame and as a result no provision is made for compensating for road shocks occurring while the trailer is moving down a road with the boat loaded thereon.

It is therefore the primary object of this invention to provide an improved trailer for boats and the like, the trailer being provided with an axle of the cranked type and there being provided suitable means for raising and lowering the trailer frame with respect to the ground by pivoting the axle, the means incorporating shock absorbing mechanisms whereby limited swinging of the axle is permitted during road travel so as to absorb the shocks normally imposed upon the trailer.

Another object of this invention is to provide an improved trailer of the cranked axle type wherein the axle in lieu of being generally U-shaped and being formed of an elongated straight central portion with upstanding end portions is bowed so as to have a maximum strength and at the same time provide a minimum portion thereof which may be in the way of other components of the trailer.

Another object of this invention is to provide an improved trailer construction which includes a cranked axle, the axle being rotated by means of an operating mechanism, the operating mechanism being resiliently mounted whereby the operating mechanism may shift slightly during the movement of the trailer along the road so as to permit limited swinging of the axle and thus the absorption of road shocks.

A further object of this invention is to provide an improved trailer for boats and the like, the trailer including a cranked axle having the central portion thereof supported by a longitudinally sliding bearing, there being provided suitable radius rods which are pivotally connected to the rear part of the trailer and to the axle for controlling the swinging of the trailer wheels relative to the trailer frame and there being forwardly extending radius rods which are connected to an actuating mechanism for effecting the raising and lowering of the frame relative to the wheels.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a plan view of the boat trailer with the boat which it normally carries being mounted thereon and shown in broken lines;

Figure 2 is a side elevational view of the boat trailer of Figure 1 and shows the frame of the boat trailer in an elevated position;

Figure 3 is a front view of the trailer and shows generally the details of the operating mechanism thereof;

Figure 4 is an elevational view similar to Figure 2 and shows the frame in a lowered position;

Figure 5 is an enlarged fragmentary sectional view taken substantially upon the plane indicated by the section line 5—5 of Figure 2 and shows the specific cross-section of the main frame member and the mounting of the spring members on the operating mechanisms; and Figure 6 is a fragmentary horizontal sectional view taken through the forward part of the trailer and shows the screw-type drive for effecting the raising and lowering of the frame of the trailer.

Referring now to the drawings in detail, it will be seen that there is illustrated the boat trailer which is the subject of this invention, the trailer being referred to in general by the reference numeral 10. The trailer 10 is of a simple construction and includes a single main frame member 12 which is in the form of a channel. The main frame member 12 includes a lower web 14 and upstanding flanges 16.

In order that a boat, such as the boat 18 may be mounted on the trailer 10 and moved therefrom, the frame member 12 is provided with a plurality of rollers 18 spaced along its length. The rollers 18 are disposed generally within the confines of the frame member 12 and are supported by shafts 20 which extend between the flanges 16.

The forward part of the frame member 12 has extending upwardly therefrom a standard 22 which is generally channel-shaped in horizontal cross-section and which is triangular in elevation, as is best shown in Figure 2. The standard 22 is provided at the upper end thereof with an upwardly rearwardly extending V-shaped bow stop 24. The bow stop 24 is intended to engage the bow of the boat 18 and to position the boat 18 on the trailer 10. Also carried by the upper part of the standard 22, but facing forwardly, is a winch 26 which is used for pulling the boat 18 onto the trailer 10 and for controlling the releasing of the boat 18.

The web 14 is provided in the rear portion thereof with a longitudinally extending slot 28 through which at least two fasteners 30 extend. The fasteners 30 secure to the underside of the web 14 for longitudinal sliding movement a bearing 32. Rotatably journaled in the bearing 32 is a central part of an axle which is referred to in general by the reference numeral 34. The axle 34 is of the cranked type and includes a forwardly bowed main portion 36 which terminates in outwardly extending horizontal spindles 38 on which wheels 40 are mounted. Extending upwardly from the main portion 36 at its intersection with the spindles 38 are crank arms 42.

Carried by each of the main portions 36 adjacent its crank arm 42 is a fitting 44 which serves to pivotally connect to each end of the main portion 36 a rear radius rod 46. The rear radius rod 46 is pivotally connected to the rear end of the frame member 12 by means of a pin 48, the pin 48 also serving to support the rear roller 18. As is best shown in Figures 2 and 6, the flanges 16 of the frame member 12 have formed in the forward portions thereof longitudinally extending slots 50. The slots 50 are aligned and have disposed therein intermediate portions of the shaft 52. The shaft 52 has mounted on the central part thereof between the flanges 16 a block 54. Disposed immediately outwardly of the flanges 16 are collars 56. Next there is disposed on each end of the shaft 52 a pair of mounting sleeves 58. Finally, there is connected to out ends of the shaft 52 forward ends of front tie rods 60. The front tie rods 60 have their rear ends pivotally connected to the crank arms 42 by means of pins 61.

From the foregoing, it will be seen that the radius and tie rods 46 and 60 control the position of the frame relative to the wheels 40 and the ground by controlling the swinging of the axle 36. Inasmuch as the rear ends of the radius rods 46 are fixed to the frame member 12, it will be seen that movement thereof is limited to a swinging one. On the other hand, the forward ends of the tie rods 60 are mounted for longitudinal movement whereby they may be longitudinally shifted to effect the swinging of the axle 34 with the swinging being controlled as to direction by the rear radius rods 46. Thus not only does the axle 34 swing when the trailer is raised and lowered, but it also slides due to the mounting of the bearing 32 for longitudinal sliding movement.

In order to control the position of the shaft 52 relative to the frame member 12, there are provided two fluid motors of the extensible type, each of the fluid motors being referred to in general by the reference numeral 62. Each fluid motor 62 includes a cylinder 64 which has secured thereto at opposite ends thereof guide plates 66 and 68. The guide plates 66 and 68 engage the respective flanges 16 and confine movement of the fluid motor 62 to longitudinal movement. Each fluid motor 62 also includes a piston rod 70 which has its forward end connected to the sleeve member 58 with which it is aligned.

Secured to the flanges 16 rearwardly of the fluid motors 62 are guides 72. The guides 72 have extending therethrough longitudinally extending shafts 74 whose rear ends are connected to shock absorbers 76 which are terminally anchored with respect to the frame member 12 by means of plate 78. The forward ends of the shafts 74 are connected to the plates 68. Mounted on the shafts 74 intermediate the plates 68 and the guide members 72 are coil springs 80 which resist rearward movement of the fluid motors 62.

In order that the fluid motors 62 may be actuated, there is mounted on the standard 22 a fluid reservoir 82. Connected to the fluid reservoir 82 and also supported by the standard 22 is a pump assembly 84. The pump assembly 84 is connected to the fluid motors 62 by means of suitable fluid lines 86. Thus by actuating the pump 84, the piston rods 70 may be selectively retracted and extended.

When the piston rods 70 are extended, the front tie rods 60 are in their forwardmost positions and the wheels 40 are in the positions illustrated in Figure 2 relative to the remainder of the trailer. However, when the piston rods 70 are retracted by permitting the fluid from the fluid motors 62 to escape and the trailer to descend by its own weight, then the wheels 40 assume the position illustrated in Figure 4 relative to the remainder of the trailer. When it is desired to elevate the trailer relative to the ground, the pump 84 is actuated which then results in the extension of the piston rod 70 to move the forward ends of the front tie rods 60 forwardly to swing the axle 34 and raise the trailer back to its normal position of Figure 2. When the trailer 10 is in its normal raised position, movement of the piston rod 70 relative to the fluid motor 62 is restricted by placing a pin 88 through each piston rod 70 as is shown in Figure 1. This locks the fluid motors 62 against actuation.

The fluid motors 62 being locked against actuation, the trailer 10 is ready for road travel. However, since the fluid motors 62 are mounted for limited movement due to the arrangement of the shafts 74, the shock absorbers 76 and the springs 80, limited swinging of the axle 34 is permitted to absorb road shocks.

Referring now to Figure 6 in particular, it will be seen that there is illustrated a mechanical operating means for the trailer which is referred to in general by the reference numeral 90. This includes longitudinally extending threaded shaft 92 which extends through the block 54 and which terminates at the rear end thereof in a head 94. The shaft 92 extends through a nut member 96 which is suitably journaled in a bearing block 98 carried by the frame member 12. The nut member 96 includes a gear 100 which is engaged by a second gear 102 carried by a drive shaft 104. The drive shaft 104 is turned by a suitable handle (not shown) so as to feed the threaded shaft 92 longitudinally of the frame member 12. The head 94 will engage the block 54 and move the block 54 and the shaft 52 forwardly to accomplish the same result as the fluid motors 62.

Disposed at the forward end of the frame 12 is a hitch assembly which is referred to in general by the reference numeral 106. The hitch assembly 106 includes a conventional type of hitch member 108 which is carried by a first support section 110. The support section 110 is hingedly connected to a second support section 112 by means of a hinge 114. The support sections 110 and 112 are guidingly engaged by a forward portion 116 of the frame 12 and are positioned by means of a pinion 118. The pinion 118 engages the rack portions 120 and 122, respectively, of the sections 110 and 112.

The pinion 118 includes an extension 124 on which a suitable crank (not shown) may be positioned for the purpose of rotating the pinion 118 to raise or lower the hitch member 108 as is necessary.

It is to be noted that the support section 110 is of a length so that when it is completely retracted relative to the frame 12, the section 112 is disposed below the frame and may be pivoted along the hinge 114 to underlie the frame 12, as is best shown in Figure 2. When in this position, the support section 112 may be retained in place by means of a latch 126 secured to the underside of the frame 12.

Because of the hitch assembly 106, when the frame 12 is lowered from its elevated position of Figure 2 to its lowered position of Figure 4, the frame 12 may remain level at all times and still be connected to the towing vehicle. It will be readily apparent that the mounting of the hitch member 108 permits this.

The foregoing is considered as illustrative only of the principles of the invention. Further, since numerous modifications and changes will readily occur to those skilled in the art, it is not desired to limit the invention to the exact construction and operation shown and described and claimed, and accordingly, all suitable modifications and equivalents may be resorted to, falling within the scope of the invention as claimed.

What is claimed as new is as follows:

1. A trailer for boats and the like, said trailer comprising an elongated load supporting frame, a crank axle having axially aligned end portions and a laterally offset midportion, wheels rotatably journaled on said end portions, mounting means slidably secured to said frame slidably securing said midportion to said frame intermediate its ends for longitudinal sliding movement along said frame and with said axle extending transversely thereof, said mounting means including a transverse bearing encompassing said midportion and journaling the latter for rotation about an axis extending substantially transversely of said frame and parallel to the axis of rotation of said wheels, said crank axle having crank arms at the outer ends thereof, rear radius rods secured between said end portions and portions of said frame disposed rearwardly of said axle, front tie rods secured between the free ends of said crank arms and portions of said frame disposed forwardly of said axle, and shift means disposed between said frame and the forward ends of said tie rods to longitudinally shift the latter whereby said crank axle will be rotated about its axis of rotation to raise and lower said end portions and said wheels relative to said frame.

2. The combination of claim 1 wherein said frame includes means engageable with said mounting means for limiting the sliding movement of said mounting means and thereby rotation of said offset midportion.

3. The combination of claim 1 including guide means on said frame engaging the forward portions of said tie rods for limiting movement of the forward ends of said tie rods to longitudinal movement only relative to said frame.

4. The combination of claim 1 wherein said axle is forwardly bowed with said end portions being disposed forwardly of said bearing.

5. The combination of claim 1 wherein said shift means includes resilient means for permitting limited rotation of said axle to compensate for road shocks.

6. The combination of claim 1 including a vertically adjustable hitch member at the forward end of said frame for retaining the frame of the trailer in a horizontally disposed position when the vertical height of the end portions of the axle is changed upon rotation of the axle by actuation of said shift means.

References Cited in the file of this patent
UNITED STATES PATENTS

| | | |
|---|---|---|
| 2,328,343 | Jacob | Aug. 31, 1943 |
| 2,610,865 | Cantrell | Sept. 16, 1952 |
| 2,621,942 | Getz | Dec. 16, 1952 |
| 2,789,835 | Ashton | Apr. 23, 1957 |